(12) United States Patent
Nakagawa et al.

(10) Patent No.: US 12,405,587 B2
(45) Date of Patent: Sep. 2, 2025

(54) CONTROLLER

(71) Applicant: TOSHIBA INFRASTRUCTURE SYSTEMS & SOLUTIONS CORPORATION, Kawasaki (JP)

(72) Inventors: Katsutoshi Nakagawa, Tokyo (JP); Yuta Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 18/040,255

(22) PCT Filed: Jun. 8, 2021

(86) PCT No.: PCT/JP2021/021680
§ 371 (c)(1),
(2) Date: Feb. 1, 2023

(87) PCT Pub. No.: WO2022/059270
PCT Pub. Date: Mar. 24, 2022

(65) Prior Publication Data
US 2023/0273586 A1 Aug. 31, 2023

(30) Foreign Application Priority Data
Sep. 17, 2020 (JP) ................................. 2020-156097

(51) Int. Cl.
*G05B 19/042* (2006.01)
(52) U.S. Cl.
CPC .............................. *G05B 19/0423* (2013.01)
(58) Field of Classification Search
CPC ........... G06F 9/52; G06F 9/54; G05B 19/418; G05B 2219/31264
See application file for complete search history.

(56) References Cited

U.S. PATENT DOCUMENTS 5,469,150 A * 11/1995 Sitte ......................... H04Q 9/14
340/3.1
9,483,101 B2 11/2016 Suzuki et al.
(Continued)

FOREIGN PATENT DOCUMENTS

CN 101034381 A 9/2007
CN 107807950 A 3/2018
(Continued)

OTHER PUBLICATIONS

Mikhail Proskuriakov, "Control of a Hydraulic Servo System Using Beckhoff Real-time Data Acquisition Computer Based on MATLAB/SIMULINK Platform," (Thesis) Lappeenranta University of Technology, Finland, 89 pages (2018).
(Continued)

*Primary Examiner* — Kidest Bahta
(74) *Attorney, Agent, or Firm* — Finnegan, Henderson, Farabow, Garrett & Dunner, LLP

(57) ABSTRACT

A controller according to an embodiment, to which an input/output device is connected, includes hardware processors. Each of the hardware processors divides data requested to be output into a size being less than or equal to an access division size threshold by making reference to a division table to update the access request data. The dividing of the data is performed in a case when a size of the data requested to be output is greater than the access division size threshold corresponding to an access waiting time in a current state. The division table indicates a correspondence relationship between an access waiting time and an access division size threshold. The access waiting time is a waiting time to access the input/output device. The access division size threshold is a threshold of a data size for determining whether to divide data requested to be output.

4 Claims, 9 Drawing Sheets

(56) References Cited

U.S. PATENT DOCUMENTS

| | | | |
|---|---|---|---|
| 10,305,781 B2 | 5/2019 | Jin | |
| 2004/0215912 A1* | 10/2004 | Vergis | G11C 11/4078 711/170 |
| 2006/0233005 A1* | 10/2006 | Schaefer | G11C 11/4076 365/1 |
| 2007/0077956 A1* | 4/2007 | Julian | H04W 52/325 455/522 |
| 2007/0078956 A1 | 4/2007 | VanGompel | |
| 2007/0226422 A1 | 9/2007 | Mino et al. | |
| 2008/0104264 A1* | 5/2008 | Duerk | H04L 69/324 711/147 |
| 2010/0312981 A1* | 12/2010 | Kajimura | G06F 13/1689 713/400 |

FOREIGN PATENT DOCUMENTS

| | | |
|---|---|---|
| CN | 108874324 A | 11/2018 |
| CN | 111339183 A | 6/2020 |
| JP | 2010-186241 A | 8/2010 |
| JP | 2018-29326 A | 2/2018 |
| WO | WO 2012/086040 A1 | 6/2012 |

OTHER PUBLICATIONS

Julian Theis et al., "Process Mining of Programmable Logic Controllers: Input/Output Event Logs," IEEE 15$^{th}$ Int'l Conf. on Automation Sci. and Eng'g (CASE), pp. 216-221, doi: 10.1109/COASE.2019.8842900, arXiv:1903.09513 (2019).

Intellectual Property India, Office Action in IN App. No. 202317017136, 7 pages (Apr. 7, 2025).

Hai-feng Liu et al., "Research on Waiting Time in Data Access Oriented Transaction—Processing Middleware," Computer Simulation 01, pp. 266, 267, 270, 271 (2005).

Adrien Lebre et al., "I/O Scheduling Service for Multi-Application Clusters," 2006 IEEE Int'l Conf. on Cluster Computing, 10 pages (2007).

PRC Nat'l IP Admin., Notice of Completing Formalities for Patent Registration in CN App. No. 202180051417.9 (Jun. 2, 2025).

* cited by examiner

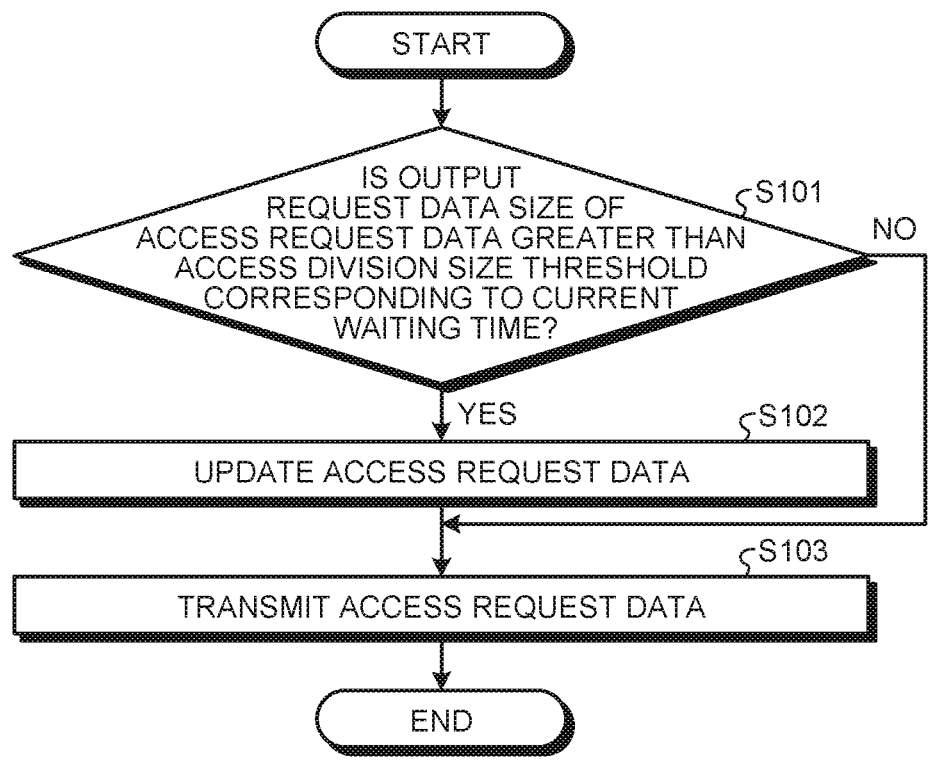

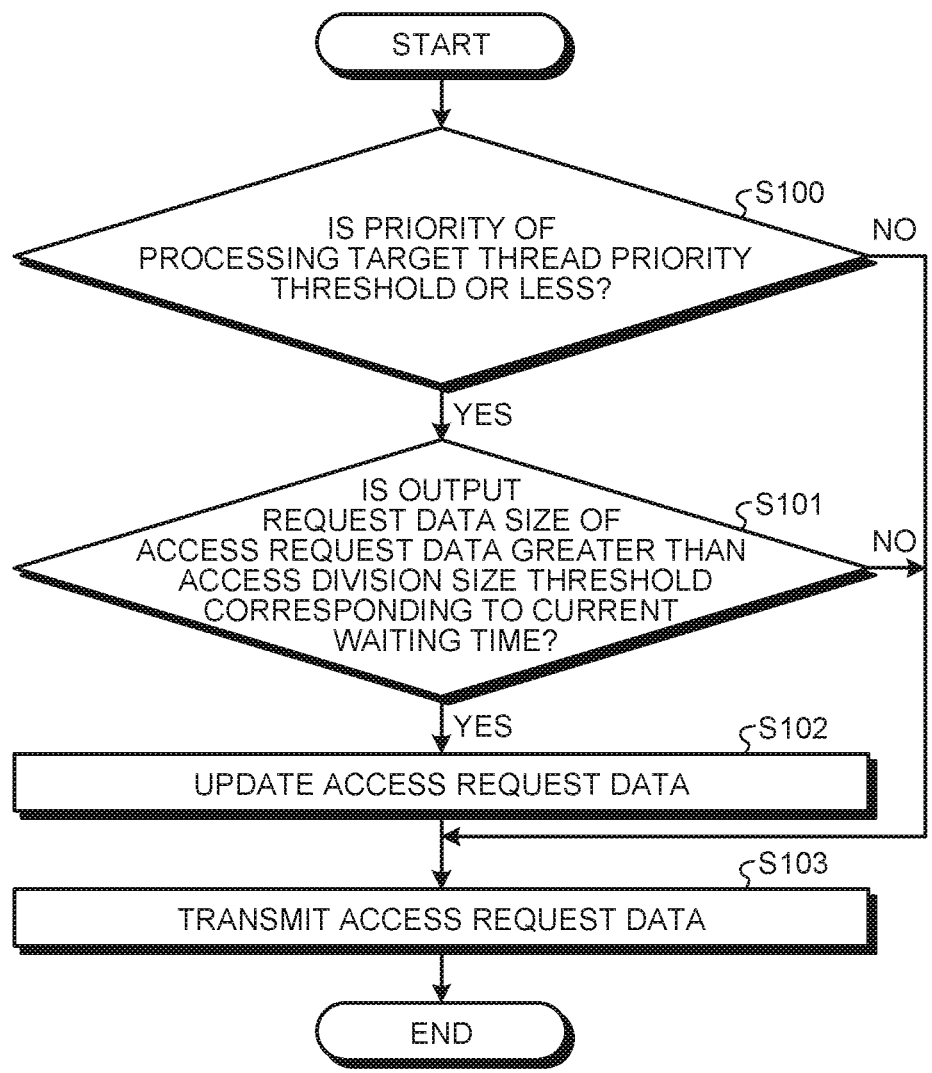

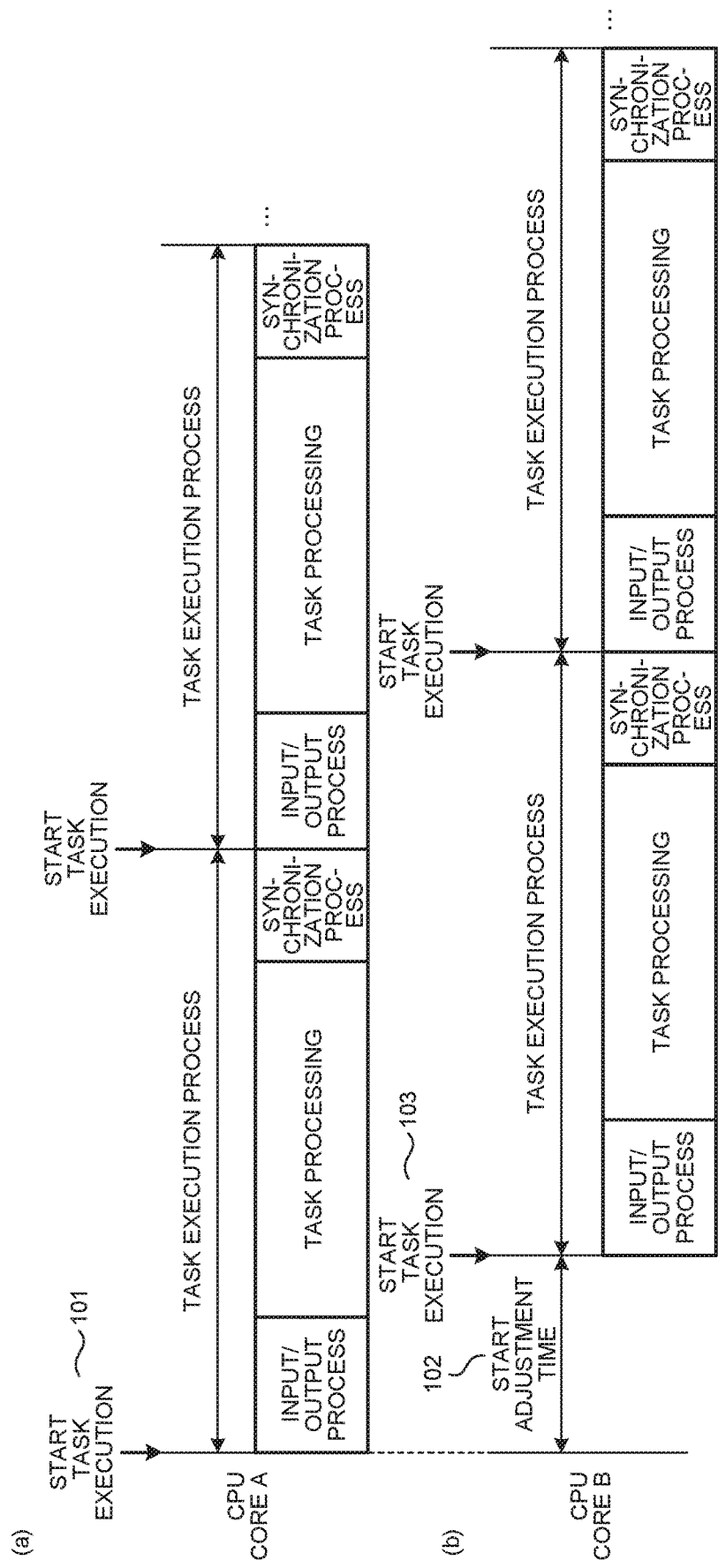

CONTROLLER

CROSS-REFERENCE TO RELATED APPLICATIONS

This application is national stage application of International Application No. PCT/JP2021/021680, filed Jun. 8, 2021, which designates the United States, incorporated herein by reference, and which claims the benefit of priority from Japanese Patent Application No. 2020-156097, filed Sep. 17, 2020, the entire contents of which are incorporated herein by reference.

FIELD

Embodiments according to the present invention relate generally to a controller.

BACKGROUND

Conventionally, there is a controller that is connected to an input/output device connected to a device group in an industrial plant and is provided with a central processing unit (CPU) module is included. In addition, in recent years, a multi-core CPU having a plurality of CPU cores has been developed, leading to also a configuration in which a controller process is executed in each of the CPU cores and an identical input/output device is accessed by each controller process.

The controller process executed by the CPU core is required to have a real-time property due to time restriction of the control target device, and thus implements task processing in a constant cycle. In addition, the CPU core performs, by the controller process, an input/output process of I/O data to be calculated in a preceding stage of the constant cycle processing.

BRIEF DESCRIPTION OF DRAWINGS

FIG. 3 is a diagram illustrating an example of a division table according to the first embodiment;

FIG. 4 is a flowchart illustrating an example of process performed by a CPU core according to the first embodiment;

FIG. 10 is a flowchart illustrating an example of processes performed by a CPU core according to a second embodiment; and FIG. 11 is a diagram illustrating a task execution process according to a third embodiment.

DETAILED DESCRIPTION

Figure 1:
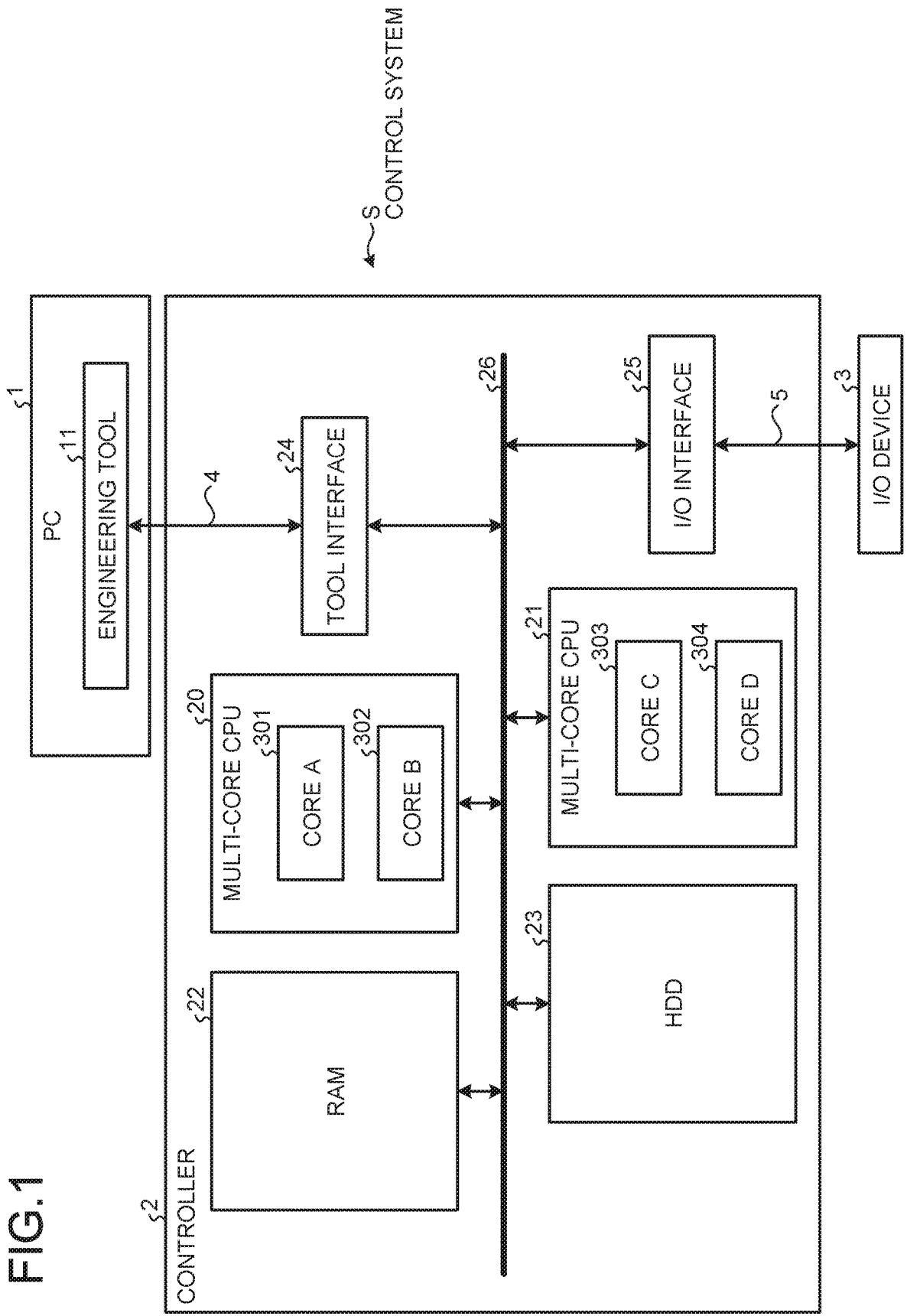
FIG. 1 is a diagram illustrating an example of an overall configuration of a control system according to a first embodiment.

According to one embodiment, a controller, to which an input/output device connected to a device group in an industrial plant is connected, includes hardware processors and a memory. The hardware processors are each configured to execute processing in a predetermined unit of processing. The memory is configured to store a division table indicating a correspondence relationship between an access waiting time and an access division size threshold. The access waiting time is a waiting time to access the input/output device as a transmission destination of access request data. The access division size threshold is a threshold of a data size for determining whether to divide data requested to be output in accordance with the access request data. Each of the hardware processors is configured to function as a division unit, an output processing unit, and an input processing unit. The division unit serves to divide data, which is requested to be output in accordance with access request data scheduled to be output, into a size being less than or equal to the access division size threshold by making reference to the division table to update the access request data. The dividing of the data is performed in a case when a size of the data requested to be output is greater than the access division size threshold corresponding to the access waiting time in a current state. The output processing unit serves to output the updated access request data to the input/output device in a case where the access request data has been updated by the division unit when the access request data is output to the input/output device in an input/output process in a preceding stage of task processing executed by a task processing unit at a predetermined cycle. The input processing unit serves to input data corresponding to the access request data from the input/output device.

Hereinafter, embodiments of a controller of the present invention will be described with referring to the drawings.

First Embodiment

FIG. 1 is a diagram illustrating an example of an overall configuration of a control system S according to a first embodiment. The control system S of the present embodiment is a system applied to an industrial plant, for example. As illustrated in FIG. 1, the control system S includes a personal computer (PC) 1 and a controller 2.

The PC 1 is a computer used by a user for creating an application program executed by the controller 2 and monitoring an operating status of the controller 2. The PC 1 includes an engineering tool 11 which is software. The engineering tool 11 is software serving to perform system construction, programming, monitoring, information collection, surveillance, and the like, related to the control system S. The PC 1 manages the controller 2 by means of the functions of the engineering tool 11.

The controller 2 is connected to an input/output device (I/O device) 3, which is connected to a device group in an industrial plant through a communication path 5, and includes processing units (for example, CPU cores) that execute processing in a predetermined unit of processing (for example, in a unit of thread). The controller 2 includes multi-core CPUs 20 and 21, a random access memory (RAM) 22, a hard disk drive (HDD) 23, a tool interface 24, an I/O interface 25, and a bus 26.

The multi-core CPUs 20 and 21 are each a CPU in which a plurality of CPU cores (hereinafter, simply referred to as "core(s)" in some cases) (an example of the hardware processors) is provided. The multi-core CPU 20 includes a core A 301 and a core B 302. The multi-core CPU 21 includes a core C 303 and a core D 304. Note that the number of cores included in each of the multi-core CPUs 20 and 21 is an example, and is not limited to two. The multi-core CPUs 20 and 21 perform entire control of the controller 2. The RAM 22 is an operation area of the multi-core CPUs 20 and 21, and is a writable storage medium.

The HDD 23 stores control software, a boot processing program, an application program, an operating system (OS), and the like.

The tool interface 24 is an interface for transmitting and receiving information to and from the PC 1 via a communication path 4. The communication path 4 is a communication path connecting the PC 1 and the controller 2 with each other. An example of the communication path 4 is, but not limited to, a high-speed communication path such as Ethernet (registered trademark) or a universal serial bus (USB).

The I/O interface 25 is an interface for transmitting and receiving information to and from the I/O device 3 via the communication path 5. The communication path 5 is a communication path connecting the controller 2 and the I/O device 3 with each other. The bus 26 is a data transmission path of the inside of the controller 2.

The I/O device 3 is a device for performing input/output with a device group constituting an industrial plant. Examples of the I/O device 3 include an input device (an analog input (AI) device or a digital input (DI) device) that inputs a signal from a sensor and the like installed in a control target facility, and an output device (an analog output (AO) device or a digital output (DO) device) that outputs a signal to an actuator and the like of the control target facility. While FIG. 1 illustrates one I/O device 3 and one I/O interface 25, the number of these devices is not limited thereto. For example, the number of I/O devices 3 and I/O interfaces 25 is changed depending on the configuration of the plant. Hereinafter, a description will be given focusing on a set of the I/O device 3 and the I/O interface 25.

Figure 2:
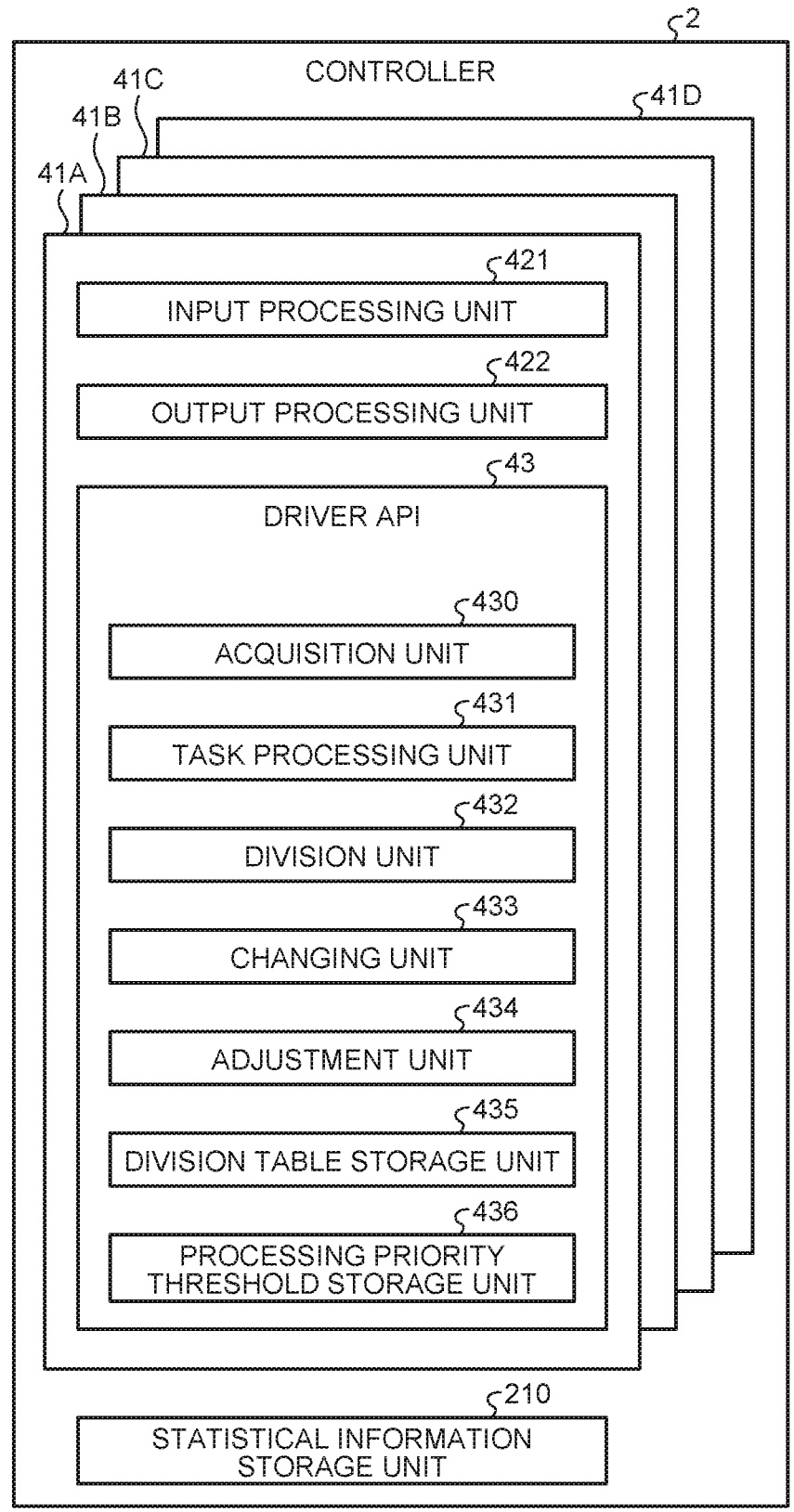
FIG. 2 is a block diagram illustrating an example of a functional configuration of a controller according to the first embodiment.

FIG. 2 is a block diagram illustrating an example of a functional configuration of the controller 2 according to the first embodiment. The controller 2 implements a controller thread 41A as a controller process operated by the core A 301 of the multi-core CPU 20. The controller 2 implements a controller thread 41B as a controller process operated by the core B 302 of the multi-core CPU 20. Hereinafter, the controller thread 41A will be mainly described as a representative of the controller threads 41A and 41B.

The controller 2 further implements a controller thread 41C as a controller process operated by the core C 303 of the multi-core CPU 21. The controller 2 implements a controller thread 41D as a controller process operated by the core D 304 of the multi-core CPU 21.

The controller thread 41A includes, as a functional configuration, an input processing unit 421, an output processing unit 422, and a driver application program interface (API) 43. The driver API 43 includes an acquisition unit 430, a task processing unit 431, a division unit 432, a changing unit 433, an adjustment unit 434, a division table storage unit 435, and a processing priority threshold storage unit 436. Note that the controller threads 41B, 41C, and 41D each have the configuration similar to the configuration of the controller thread 41A, so that the description thereof will be omitted.

The division table storage unit 435 and the processing priority threshold storage unit 436 are actualized by, for example, the RAM 22 (FIG. 1) and the HDD 23 (FIG. 1) (details will be described below).

The division table storage unit 435 stores a division table indicating a correspondence relationship between an access waiting time to access the I/O device 3 and an access division size threshold being a threshold of a data size for determining whether to divide data requested to be output in accordance with access request data scheduled to be output.

FIG. 3 is a diagram illustrating an example of a division table of the first embodiment. The division table is a table in which an access division size threshold is defined for each access waiting time. For example, the longer the access waiting time, the smaller the access division size threshold.

Returning to FIG. 2, the input processing unit 421 performs an input process of various types of information. The input processing unit 421 inputs, for example, data corresponding to the access request data from the I/O device 3, for example.

The output processing unit 422 performs an output process of various types of information. The output processing unit 422 outputs, for example, access request data to the I/O device 3 in the input/output process at a preceding stage of task processing executed by the task processing unit 431 at a predetermined cycle. At that time, in a case where the access request data has been updated by the division unit 432, the output processing unit 422 outputs the updated access request data to the I/O device 3. The remaining data requested to be output is also updated by the division unit 432 as necessary, and an output to the I/O device 3 is requested.

The acquisition unit 430 acquires various types of information from the controller thread 41, a device driver 52, the I/O device 3, and the like.

The task processing unit 431 performs predetermined task processing on the basis of data acquired from the I/O device 3.

The division unit 432 makes reference to the division table stored in the division table storage unit 435. When the size of the data requested to be output in accordance with the access request data scheduled to be output is greater than the access division size threshold corresponding to the access waiting time in a current state, the division unit 432 divides the data requested to be output into a size being less than or equal to the access division size threshold, and updates the access request data.

In addition, the controller 2 includes a statistical information storage unit 210. The statistical information storage unit 210 is actualized by the RAM 22 (FIG. 1) and the HDD 23 (FIG. 1), for example. The statistical information storage unit 210 stores statistical information including an average waiting time of access request data to the I/O device 3 and an average processing time of access request data.

Figure 7:
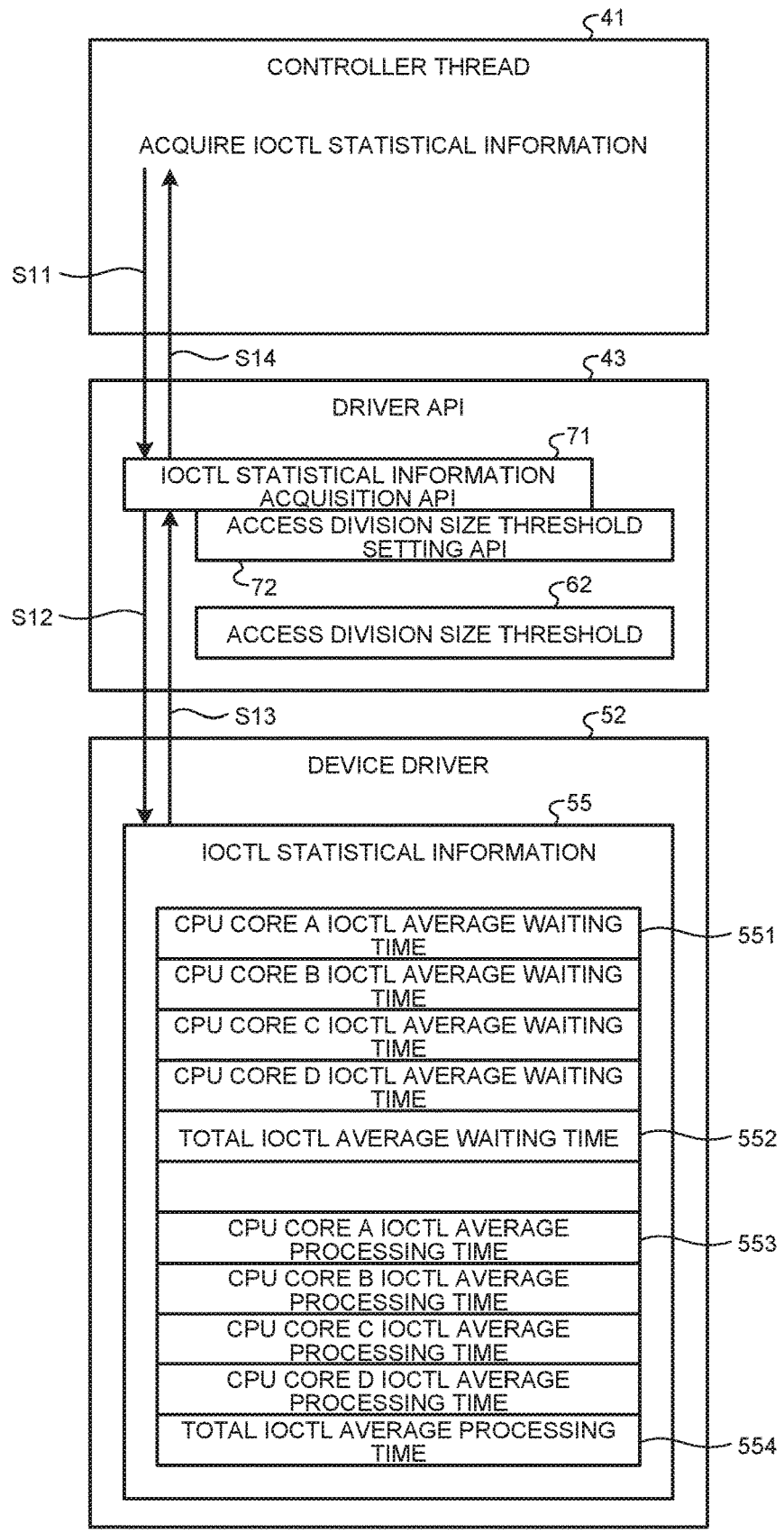
FIG. 7 is a diagram illustrating an IOCTL statistical information acquisition process according to the first embodiment.

IOCTL statistical information 55 illustrated in FIG. 7 is an example of the statistical information. The IOCTL statistical information 55 is information including an IOCTL average waiting time 551 for each of the CPU cores A to D, a total IOCTL average waiting time 552, an IOCTL average processing time 553 for each of the CPU cores A to D, and a total IOCTL average processing time 554.

Returning to FIG. 2, the changing unit 433 changes the access division size threshold stored in the division table. The changing unit 433 changes the access division size threshold in the division table on the basis of, for example, the statistical information (IOCTL statistical information 55 in FIG. 7) stored in the statistical information storage unit 210 (details will be described below). The adjustment unit 434 will be described in a third embodiment.

FIG. 4 is a flowchart illustrating an example of processes performed by the CPU core according to the first embodiment. While the core A 301, the core B 302, the core C 303, and the core D 304 each perform the process of FIG. 4, the core A 301 is defined as a representative operation subject here.

When the core A 301 transmits (outputs) the access request data to the I/O device 3, in step S101, the division unit 432 makes reference to the division table stored in the division table storage unit 435 and determines whether the size of the data requested to be output in accordance with the access request data scheduled to be output is greater than the access division size threshold corresponding to the access waiting time in the current state. In a case of Yes, the process proceeds to step S102. In a case of No, the process proceeds to step S103.

In step S102, the division unit 432 divides the data requested to be output in accordance with the access request data into a size being less than or equal to the access division size threshold and updates the access request data. In step S103, the output processing unit 422 outputs the access request data to the I/O device 3. When the process has passed through step S102, the output processing unit 422 outputs to the I/O device 3 the access request data updated in step S102.

Figure 5:
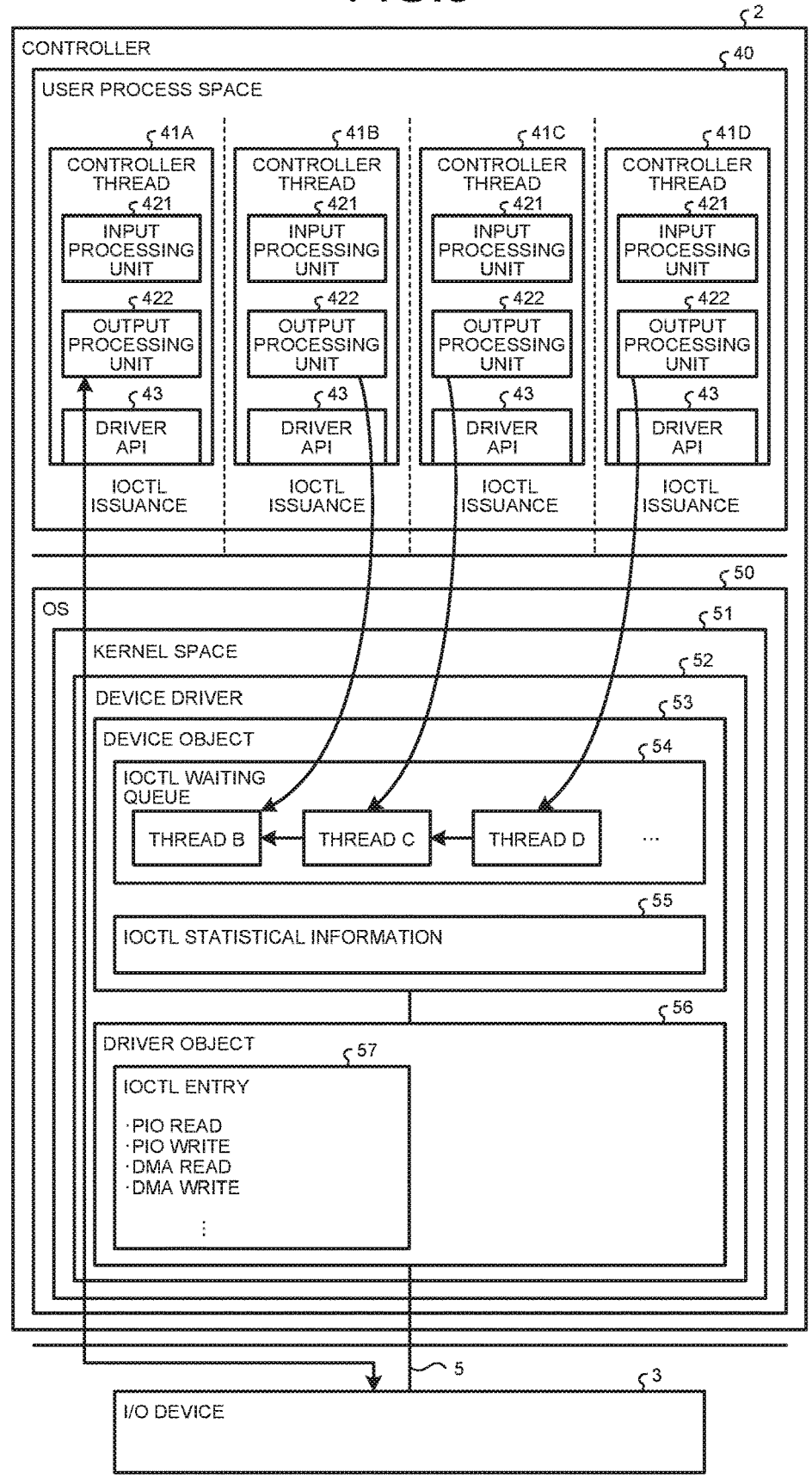
FIG. 5 is a diagram illustrating an input/output process performed by the CPU core according to the first embodiment.

Hereinafter, a more specific example will be described. FIG. 5 is a diagram illustrating an input/output process performed by a CPU core according to the first embodiment. In the controller 2, a user process space 40 and a kernel space 51, which is used by the OS 50, are generated on the RAM 22. In the user process space 40, the controller process running on the CPU module is divided into the controller threads 41A, 41B, 41C, and 41D. For example, the core A 301 actualizes the controller thread 41A, the core B 302 actualizes the controller thread 41B, the core C 303 actualizes the controller thread 41C, and the core D 304 actualizes the controller thread 41D.

In the present embodiment, each of the controller threads is actualized by two cores (cores A to D) mounted on two multi-core CPUs 20 and 21, but the configuration of the controller threads is not limited thereto. For example, each of the controller threads may be actualized by four cores mounted on a single multi-core CPU, or may be actualized by a multi-processor configuration in which CPUs are separated into four. The unit of processing is not limited to a unit of the controller thread, and may be a unit of the controller process, for example.

Hereinafter, for simplifying the description, the controller thread will be described as an operation subject in some cases. When similar operations are performed on the controller threads 41A, 41B, 41C, and 41D, the controller thread 41A will be described as a representative in some cases. The controller thread is simply referred to as a "thread".

Figure 9:
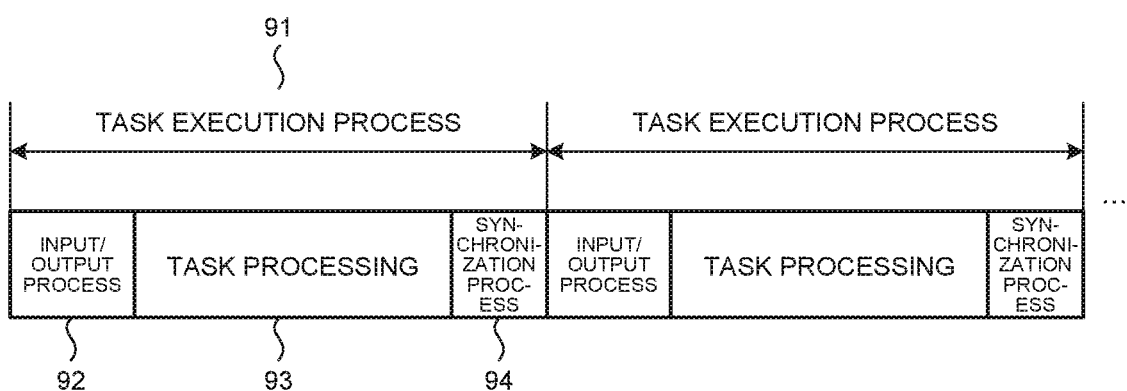
FIG. 9 is a diagram illustrating a task execution process according to the first embodiment.

The controller thread 41A periodically repeats a task execution process such that the task execution time follows a set control period. Here, FIG. 9 is a diagram illustrating a task execution process according to the first embodiment. As illustrated in FIG. 9, a task execution process 91 includes an input/output process 92, task processing 93, and a synchronization process 94. Such a task execution process 91 is periodically repeated.

Returning to FIG. 5, when accessing the I/O device 3 in the input/output process 92 (FIG. 9), the controller thread 41A issues an IOCTL (system call) to the device driver 52 by using the driver API 43. In response to this, the device driver 52 accesses the I/O device 3 by IOCTL processing.

The device driver 52 includes a device object 53 and a driver object 56. The device object 53 has an IOCTL waiting queue 54 and IOCTL statistical information 55.

The driver object 56 has an IOCTL entry 57. The IOCTL entry 57 stores information regarding Programmed I/O (PIO) reading, PIO writing, Direct Memory Access (DMA) reading, DMA writing, and the like.

After starting an access to the I/O device 3, the device driver 52 cannot interrupt the access. Thus, while the device driver 52 is performing the IOCTL processing of one thread, the IOCTL processing of the other thread is kept waiting in a state of being stored in the IOCTL waiting queue 54.

Upon finishing the IOCTL processing that has been in progress, the device driver 52 dequeues the first thread of the IOCTL waiting queue 54 and starts the IOCTL processing. The processing of the device driver 52 is performed in a state where switching of execution to another thread is prohibited. Therefore, an increase in the waiting time for IOCTL processing leads to a delay in the scan execution time of the controller thread.

Figure 6:
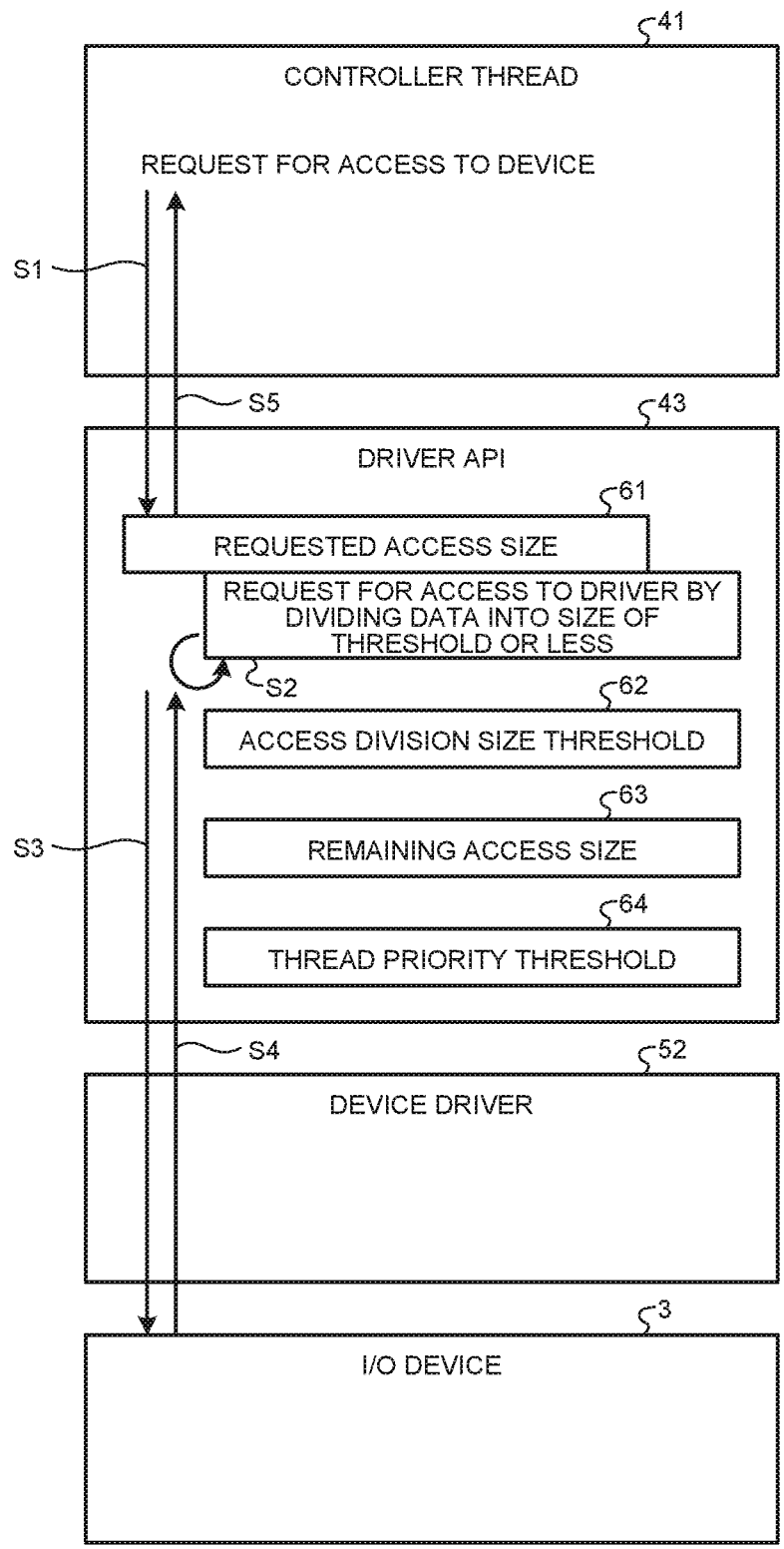
FIG. 6 is a diagram illustrating an access request data division process performed by the CPU core according to the first embodiment.

The driver API 43 holds a division table (FIG. 3) including an access division size threshold. Hereinafter, also FIG. 6 will be referenced. FIG. 6 is a diagram illustrating an access request data division process performed by the CPU core according to the first embodiment. Note that a thread priority threshold 64 will be described in the second embodiment.

When receiving a function call to the driver API 43 from the controller thread 41 (S1 of FIG. 6), the driver API 43 stores a requested access size 61 (size of data requested to be output in accordance with the access request data) in a remaining access size 63.

Next, the driver API 43 compares the requested access size 61 with the access division size threshold 62 (refer to FIG. 3). In a case where the requested access size 61 is greater than the access division size threshold 62, the driver API 43 changes the requested access size 61 to the size of the access division size threshold 62 (S2 in FIG. 6), and requests the IOCTL processing to the device driver 52 (S3 in FIG. 6).

When the process of the device driver 52 is completed and the operation is returned to the driver API 43 (after S4 in FIG. 6), the driver API 43 subtracts the requested access size 61 from the remaining access size 63. When there is the remaining access size 63, the driver API 43 sets the remaining access size 63 as the requested access size 61 and repeatedly executes the IOCTL processing request to the device driver 52.

When the operation of the device driver 52 is completed and the operation returns to the driver API 43, it is possible to switch the execution to another thread having a high execution priority. As described above, with a configuration in which the data requested to be output in accordance with the access request data from the controller thread 41 to the I/O device 3 is divided by the driver API 43 into the access size being less than or equal to the access division size threshold 62 so as to update the access request data, and the access request data is requested to the device driver 52, it is possible to reduce the time that the controller thread 41 having a high execution priority is kept waiting due to the controller thread 41 having a low execution priority at occurrence of conflict of access to the I/O device 3 between the controller threads 41. After S4 in FIG. 6, data from the I/O device 3 is passed from the driver API 43 to the controller thread 41 (S5 in FIG. 6).

Figure 8:
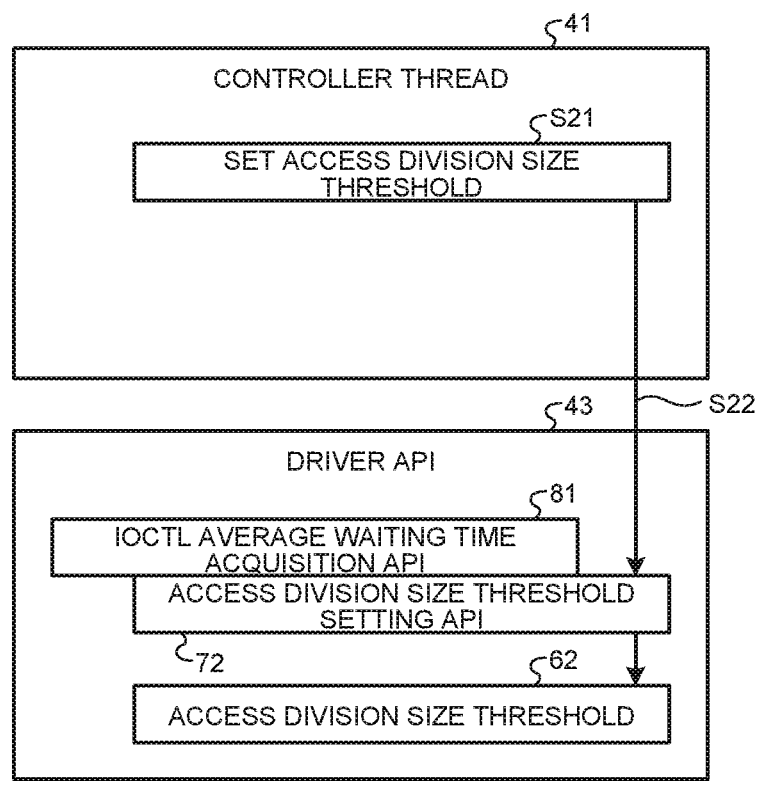
FIG. 8 is a diagram illustrating an access division size threshold setting process according to the first embodiment.

Hereinafter, also FIGS. 7 and 8 will be referenced. FIG. 7 is a diagram illustrating an IOCTL statistical information acquisition process according to the first embodiment. FIG. 8 is a diagram illustrating an access division size threshold setting process according to the first embodiment. The driver API 43 includes an access division size threshold setting API 72 (changing unit 433). When the controller thread 41 calls the access division size threshold setting API 72 (S21 and S22 in FIG. 8), the access division size threshold setting API 72 sets a value designated by a parameter to the access division size threshold 62. With this process, the access division size threshold 62 can be dynamically changed even in a RUN state where the controller thread 41 has started the task processing 93 (FIG. 9). As illustrated in FIG. 8, the driver API 43 includes an IOCTL average waiting time acquisition API 81 (acquisition unit 430).

More specifically, the access division size threshold 62 can be changed as follows. As illustrated in FIG. 7, the device driver 52 holds, as the IOCTL statistical information 55, information including the IOCTL average waiting time 551 for each of the CPU cores A to D, the total IOCTL average waiting time 552, the IOCTL average processing time 553 for each of the CPU cores A to D, and the total IOCTL average processing time 554, and updates the IOCTL statistical information 55 at the end of the IOCTL processing.

The driver API 43 includes IOCTL statistical information acquisition API 71 (acquisition unit 430). The driver API 43 acquires the IOCTL statistical information 55 held by the device driver 52 (S12 and S13 in FIG. 7) when the acquisition of the IOCTL statistical information is requested from the controller thread 41 (S11 in FIG. 7), and responds to the controller thread 41 (S14 in FIG. 7). This enables the controller thread 41 to recognize the IOCTL statistical information 55.

The access division size threshold setting API 72 of the controller thread 41 can appropriately calculate the access division size threshold 62 on the basis of: the total IOCTL average waiting time 552 and the total IOCTL average processing time 554 recognized using the above functionalities, and the upper limit time of IOCTL processing set in advance in accordance with the task execution time of the controller thread 41 (the time of the task execution process 91 of FIG. 9). This enables the access division size threshold 62 to be dynamically changed in the RUN state.

In this manner, according to the controller 2 of the first embodiment, when the size of the data requested to be output to the I/O device 3 is greater than the access division size threshold corresponding to the access waiting time in the current state, the access request data will be updated with divided data having the size being less than or equal to the access division size threshold, making it possible to reduce the access waiting time.

In addition, the access division size threshold can be dynamically changed to an appropriate value on the basis of the statistical information.

Second Embodiment

Next, a second embodiment will be described. Description similar to that in the first embodiment will be omitted as appropriate. In FIG. 2, the division unit 432 makes reference to the division table of the division table storage unit 435. In a case where the size of data requested to be output according to the access request data scheduled to be output is greater than the access division size threshold corresponding to the access waiting time in the current state, and the priority of processing of the access request data is lower than or equal to the priority threshold (the thread priority threshold 64 of FIG. 6) corresponding to the processing stored in the processing priority threshold storage unit 436 (FIG. 2), the division unit 432 divides the data requested to be output in accordance with the access request data into a size being less than or equal to the access division size threshold and thereby updates the access request data.

FIG. 10 is a flowchart illustrating an example of processes performed by a CPU core according to the second embodiment. Similarly to the case of FIG. 4, the core A 301 is representatively used as the operation subject.

When the core A 301 transmits (outputs) an access request data to the I/O device 3, in step S100, the division unit 432 makes reference to the processing priority threshold storage unit 436 and determines whether the priority of the thread to be processed is lower than or equal to the priority threshold. In a case of Yes, the process proceeds to step S101, and in a case of No, the process proceeds to step S103.

In step S101, the division unit 432 makes reference to the division table stored in the division table storage unit 435 and determines whether the size of the data requested to be output in accordance with the access request data is greater than the access division size threshold corresponding to the access waiting time in the current state. In a case of Yes, the process proceeds to step S102, and in a case of No, the process proceeds to step S103.

In step S102, the division unit 432 divides the data requested to be output in accordance with the access request data into a size being less than or equal to the access division size threshold and thereby updates the access request data. In step S103, the output processing unit 422 outputs the access request data to the I/O device 3. In a case where the process has passed through step S102, the output processing unit 422 outputs to the I/O device 3 the access request data updated in step S102.

In this manner, according to the controller 2 of the second embodiment, the processing priority threshold storage unit 436 (driver API 43) holds the threshold of the priority of the thread. When the driver API 43 is executed, the priority of the thread being executed is compared with the threshold. In a case where the priority of the thread being executed is lower than or equal to the threshold, the data requested in accordance with the access request data is divided into the size being less than or equal to the access division size threshold 62, and the access request data is updated as a request to the device driver 52. This makes it possible to decrease the overhead of a thread having a high execution priority, leading to highly effective reduction of access waiting time.

Third Embodiment

Next, a third embodiment will be described. Description similar to that in the first embodiment will be omitted as appropriate. In FIG. 2, the adjustment unit 434 adjusts the repetition timing of the processing cycle of each of the threads so as to reduce the average waiting time, on the basis of the statistical information (IOCTL statistical information 55 in FIG. 7) stored in the statistical information storage unit 210.

FIG. 11 is an explanatory diagram of a task execution process according to the third embodiment. Illustration (a) in FIG. 11 represents a processing cycle of the CPU core A.

Here, the adjustment unit 434 adjusts, for example, the start timing of the task execution process of the CPU core B on the basis of the statistical information stored in the statistical information storage unit 210 so as to reduce the average waiting time.

Illustration (b) in FIG. 11 represents a processing cycle of the CPU core B. In comparison with the start timing 101 of the task execution process of the CPU core A in the illustration (a) in FIG. 11, the start timing 103 of the task execution process of the CPU core B in the illustration (b) in FIG. 11 is adjusted to be delayed by a start adjustment time 102.

The adjustment unit 434 can calculate the start adjustment time 102 as, for example, a remainder obtained by dividing "core number of operating process×overall IOTCL average waiting time" by "task execution time−overall IOTCL average waiting time−overall IOTCL average processing time".

In this manner, with the use of the controller 2 of the third embodiment, by adjusting the start timing of the task execution process for each thread on the basis of the IOCTL statistical information 55 so as to reduce the average waiting time, it is possible to reduce the conflict of the input/output process between the controller threads, leading to further reduction of the access waiting time.

Program to be executed by the controller 2 of each of the above-described embodiments is recorded on an HDD or the like. The program may be provided in a state of being recorded in a computer-readable recording medium such as a CD-ROM, a flexible disk, a CD-R, or a DVD as a file in an installable format or an executable format. The program may be stored on a computer connected to a network such as the Internet and provided by being downloaded via the network. The program may be provided or distributed over a network such as the Internet. The program may be provided in a state of being incorporated in a ROM or the like in advance.

The program has a module configuration including the above-described units (input processing unit 421, output processing unit 422, acquisition unit 430, task processing unit 431, division unit 432, changing unit 433, and adjustment unit 434). In an actual hardware configuration, the multi-core CPUs 20 and 21 read out a control processing program from the HDD and execute the readout program, whereby the above-described units are loaded on the main storage device and generated on the main storage device.

Although some embodiments of the present invention have been described, these embodiments have been presented as examples, and are not intended to limit the scope of the invention. These novel embodiments can be implemented in various other forms, and various omissions, substitutions, and alterations can be made without departing from the spirit of the invention. These embodiments and modifications thereof are included in the scope and spirit of the invention, and are included in the invention described in the claims and the equivalent scope thereof.

The invention claimed is:

1. A controller to which an input/output device connected to a device group in an industrial plant is connected, the controller comprising:
    hardware processors each configured to execute processing in a predetermined unit of processing; and
    a memory configured to store a division table indicating a correspondence relationship between an access waiting time and an access division size threshold, the access waiting time being a waiting time to access the input/output device as a transmission destination of access request data, the access division size threshold being a threshold of a data size for determining whether to divide data requested to be output in accordance with the access request data,
    wherein each of the hardware processors is configured to function as:
        a division unit serving to divide data, which is requested to be output in accordance with access request data scheduled to be output, into a size being less than or equal to the access division size threshold by making reference to the division table to update the access request data, the dividing of the data being performed in a case when a size of the data requested to be output is greater than the access division size threshold corresponding to the access waiting time in a current state;
        an output processing unit serving to output the updated access request data to the input/output device in a case where the access request data has been updated by the division unit when the access request data is output to the input/output device in an input/output process in a preceding stage of task processing executed by a task processing unit at a predetermined cycle; and
        an input processing unit serving to input data corresponding to the access request data from the input/output device.

2. The controller according to claim 1, wherein each of the hardware processors is further configured to function as a changing unit serving to change the access division size threshold stored in the division table on the basis of statistical information including an average waiting time to access the input/output device and an average processing time of the access request data.

3. The controller according to claim 1, wherein
    the memory is further configured to store a priority threshold being a threshold of priority for each of processes, and
    the division unit serves to divide the data, which is requested to be output in accordance with access request data scheduled to be output, into a size being less than or equal to the access division size threshold by making reference to the division table to update the access request data, the dividing of the data being performed in a case when
        a size of the data requested to be output is greater than the access division size threshold corresponding to the access waiting time in a current state, and
        a priority of processing of the access request data is lower than or equal to the priority threshold corresponding to the processing stored in the memory.

4. The controller according to claim 1, wherein each of the hardware processors is further configured to function as an adjustment unit serving to adjust a repetition timing of the cycle to reduce an average waiting time to access the input/output device, on the basis of statistical information including the average waiting time and an average processing time of the access request data.

* * * * *